United States Patent [19]

Cocke et al.

[11] Patent Number: 4,642,765

[45] Date of Patent: Feb. 10, 1987

[54] OPTIMIZATION OF RANGE CHECKING

[75] Inventors: John Cocke, Bedford; Peter W. Markstein; Victoria I. Markstein, both of Yorktown Heights, all of N.Y.

[73] Assignee: International Business Machines Corporation, Armonk, N.Y.

[21] Appl. No.: 723,395

[22] Filed: Apr. 15, 1985

[51] Int. Cl.⁴ ................................................ G06F 9/44
[52] U.S. Cl. ..................................................... 364/300
[58] Field of Search .......................................... 364/300

[56] References Cited

U.S. PATENT DOCUMENTS

4,571,678 2/1986 Chaitin ................................. 364/300

Primary Examiner—Raulfe B. Zache
Attorney, Agent, or Firm—Roy R. Schlemmer

[57] ABSTRACT

A method operable within an optimizing compiler to move certain range check instructions out of single entry strongly connected regions or loops and into linear regions of the instruction stream whereby computational efficiency is increased with no loss of program accuracy. The method comprises placing a range check trap instruction into the header node of the SCR provided there is only one conditional exit from the SCR, modifying the conditional exit test based on the value of the induction variable v, and inserting a new check at the loop exit point(s) to insure that the induction variable has reached the value it would have obtained in the original (unmodified) program.

6 Claims, 11 Drawing Figures

FIG.1

THE SIMPLEST SCR WITH A RANGE CHECK
AND INDUCTION VARIABLE

RANGE CHECK: IF v>LIMIT THEN ABORT v=v+rc , ITERATE
IF v≤m THEN ITERATE v=INDUCTION VARIABLE
LIMIT,rc,m=REGION CONSTANTS

FIG.2

EQUIVALENT COMPUTATION TO FIG.1,
WITH RANGE CHECKING REMOVED FROM THE SCR

RANGE CHECK: IF v> LIMIT THEN ABORT
t=min(m,LIMIT)

NOTE: NO RANGE CHECK IN LOOP
v=v+rc
IF v≤t THEN ITERATE

RANGE CHECK:
IF v<m THEN ABORT v=INDUCTION VARIABLE
LIMIT,rc,m,t=REGION CONSTANTS

FIG.3
AN SCR WITH A CONDITIONAL EXIT WHICH IS INDEPENDENT OF THE INDUCTION VARIABLE

RANGE CHECK: IF v>LIMIT THEN ABORT
IF r THEN EXIT v=v+rc
IF v≤m THEN ITERATE v=INDUCTION VARIABLE
r=RELATION INDEPENDENT OF v
rc,m,LIMIT=REGION CONSTANTS

FIG.4

EQUIVALENT COMPUTATION TO FIG.3
WITH RANGE CHECKING REMOVED
FROM THE SCR

FIG.5

AN SCR WITH
CONDITIONAL EXIT AFTER
CONDITIONAL EXIT BASED
ON THE INDUCTION VARIABLE v=INDUCTION VARIABLE
r=RELATION INDEPENDENT OF v
rc,m,LIMIT=REGION CONSTANTS

FIG. 6 INCORRECT TRANSFORMATION OF FIG. 5

FIG. 7

CORRECT TRANSFORMATION OF FIG. 5

FIG. 9
(BLOCK 3 OF FIG. 8)

FIG. 8

FIG.10 (BLOCK 3 OF FIG.9)
HIGH LEVEL FLOWCHART FOR RANGE CHECK OPTIMIZATION

FIG.11 (DETAILS OF BOX 8, IN FIG.10)

OPTIMIZATION OF RANGE CHECKING

FIELD OF THE INVENTION

The present invention has particular utility in a compiler in which optimization algorithms are used to improve the quality of the code, and in which the compiler automatically inserts code to perform range checking. In particular, this invention makes it possible to reduce the amount of range checking which must be performed during the execution of object programs, and in some cases, makes it possible to remove the range checking code entirely, when the optimization routines determine that the variables whose ranges are being checked do not fall outside the prescribed ranges.

While the invention will find utility in optimization compilers for all types of computers, it has particular significance for reduced instruction set computers, for which the code produced by compilers is often more voluminous than code produced for complex instruction set computers, because each instruction of a reduced instruction set computer is simpler and performs less function. Furthermore, in a reduced instruction set computer, there is often less memory protection hardware built into the computer. To preserve integrity of memory, compilers for such reduced instruction set computers insert code to guarantee that addressing remains within prescribed areas. Such code can be optimized by this invention, and thereby reduces the cost of software memory protection. The quality of code produced by compilers has been an issue ever since the first compiler was produced. One of the principal objectives of IBM's FORTRAN I compiler, the first commercially available compiler, was to produce object code in the field of scientific computation which was comparable in code quality to that produced by assembly language programmers.

Today, higher level languages are designed to be used in every field in which computers are applicable. Even the original FORTRAN language has been bolstered to make it applicable to a wide range of programming tasks. However, it is still important that the quality of code produced by the compiler be high, especially if the resultant code is to be used in a production environment. Code produced by a skilled assembly language programmer is still the yardstick against which compiler produced code is measured.

A large number of optimization techniques have been developed and refined since the 1950's to improve the quality of compiler generated code. Indeed, many of these optimizations were known in principle, and used in some fashion by the team that produced the first FORTRAN compiler.

Optimizations that are frequently employed in optimizing compilers include common subexpression elimination, moving code from regions of high execution frequency to regions of low execution frequency (code motion), dead code elimination, reduction in strength (replacing a slow operation by an equivalent fast operation), and constant propagation. Descriptions of these optimizations can be found in:

J. T. Schwartz, *On Programming—An Interim* Report on the SETL Language. *Installment II: The SETL Language and Examples of Its Use.* Courant Institute of Mathematical Sciences, NYU (1973), pp 293-310.

A. Aho, and J. Ullman, *Principles of Compiler Design*, Addison-Wesley, (1977).

PRIOR ART

The optimization of range checking is a relatively new notion, and is not dealt with in the above-mentioned references. The general concepts have been previously published in the following paper on the Optimization of Range Checking. However, it has since been discovered that the range checking optimization disclosed in that paper is seriously flawed in that it causes the optimization to generate incorrect code in certain instances of control flow. The present invention overcomes the defect in the published paper. The specific reference to this prior paper is:

V. Markstein, J. Cocke and P. Markstein, *Optimization of Range Checking,* Proc. of the SIGPLAN (1982) Symposium on Compiler Construction, pp 114-119, ACM Order Number 548820, Baltimore, MD.

Other references which deal specifically with range checking, or analysis of ranges of variables are:

W. Harrison, *Compiler Analysis of the Value Ranges for Variables,* IEEE Transactions of Software Engineering, (May 1974); pp 243-250.

J. Welsh, Economic *Range Checks in Pascal,* Software—Practice and Experience, (1978): Vol. 8, pp 85-97.

Harrison's paper does not touch on the subject of optimizing range checks. He does describe range analysis, which is one of the techniques which this invention employs to achieve its goals. Harrison's range analysis is more complex than the present method and it is able to perform range analysis in more complex situations than attempted here. If Harrison's range analysis technique were to be combined with the present invention, the result would be a range check optimization technique which is more powerful than the one described here albeit much more complex and difficult to implement. Welsh's technique for range check optimization depends strongly on the nature of data structure declarations in the PASCAL programming language, and the inclusion of assertions in the programming language. His range check optimization can be carried out during syntactic and semantic analysis. It cannot cope with as general control flow situations as the present invention.

SUMMARY AND OBJECTS OF THE INVENTION

It is a primary object of the invention to provide a method operable within an optimizing compiler for removing range check computations from a single entry strongly connected region in the instruction stream when the range check instruction contains a comparand that is linearly related to the induction variable which controls whether control remains in the SCR.

It is a further object to provide such a method which also places in the header node of the single entry strongly connected region a range check instruction to determine whether the range check would have failed during the first iteration.

It is another object to provide such a method which ascertains that the SCR has been executed the correct number of times, by determining if the induction variable has attained its expected final value.

It is another object to provide such a method which produces correct optimized code in the situation where the only exit from a strongly connected region is a conditional exit based on a test of the induction variable.

It is yet another object to provide such a method which produces correct optimized code in the situation where there is one conditional exit based on a test of the induction variable, and there are additional conditional exits none of which involve the induction variable. These additional conditional exits may occur anywhere in the strongly convected region.

It is a still further object of the present invention to provide a method operable within an optimizing compiler which moves certain range check instructions out of single entry strongly connected regions or loops and into linear regions of the instruction stream whereby computational efficiency is increased with no loss of program accuracy. Broadly, the method comprises placing a range check trap instruction into the header node of the SCR provided there is only one conditional exit from the SCR, modifying the conditional exit test based on the value of the induction variable v, and inserting a new check(s) at the loop exit point(s) to insure that the induction variable has reached the value it would have obtained in the original (unmodified) program.

DISCLOSURE OF THE INVENTION

To facilitate the following description of the present invention, the range check optimization advocated in the above-referenced paper by Markstein, Cocke and Markstein will first be described. To facilitate the description, the following terminology will be defined.

Definition

Subgraph: The expression subgraph as used herein denotes a subset of the nodes of the overall flow graph of the program, and those edges of the flow graph which connect the nodes in the subset.

Strongly Connected Region: A subgraph in which there exits a path between any pair of nodes in the subgraph using only edges of the subgraph.

Single Entry Strongly Connected Region: A strongly connected region in which there is only one node which has predecessors outside the strongly connected region. A single entry strongly connected region corresponds to the common programming notion of a loop. In the present description the acronym SCR is used to mean a single entry strongly connected region.

USE Function: The USE function for a program point P identifies all program points (instructions) where the object computed at P is used as an operand.

DEF Function: The DEF function for a program point P and an Operand O which is used at P is the set of all program points at which O is computed and from which program point P can be reached without passing through another computation of O.

Region Constant: A region constant, (rc) with respect to an SCR, is an object that is not computed in the SCR; that is, the DEF function for rc includes no program points (instructions) in the SCR.

Induction Variable: An induction variable v for an SCR, is a variable which has only one program point within that SCR given by its DEF function, and the computation of v is of the form:

$$v = v + rc$$

where rc is a region constant.

Entry node: The entry node of an SCR is the unique node within the SCR which has predecessors not contained in the SCR.

Header node: The header node of an SCR is the unique predecessor of the entry node which is not contained in the SCR. If an SCR does not contain a header node, the control flow graph can easily be modified to an equivalent control flow graph with a header node, as will be apparent to those skilled in the art.

Articulation node: An articulation node of a subgraph is a node which must be visited on every traversal of the subgraph.

Trap instruction: A trap instruction is an intermediate language instruction used to encode range checks. The trap instruction specifies a relation R and two operands X and Y. If the relation:

$$X \: R \: Y$$

is false, the program terminates (because a range condition has been violated); otherwise the program proceeds with the next sequential instruction. Traps may be realized in the final code by a conventional compare instruction followed by a conditional jump or call to an error routine.

Description

The objects of the present invention are accomplished in general by a procedure operable within an optimizing compiler for removing range checking trap instructions from program loops and placing said instructions in linear portions of the instruction stream whereby the frequency of execution will be greatly reduced thus resulting in significant improvements in the efficiency of the execution of the resultant compiled program. More particularly, the procedure involves properly recoding the program where the loop is characterized by a conditional exit based on an induction variable v followed by a conditional exit not based on the induction variable. The procedure includes identifying the single entry strongly connected region (SCR) or loop within an instruction stream having a trap instruction therein for the purpose of range checking, said trap instruction comparing v to a region constant. The induction variable v must meet three conditions:

(1) v is modified once in the loop, (2) modification of v in the loop is in an articulation node, and (3) there is exactly one conditional exit C from the loop which results from comparing v with a region constant. The trap instruction may then be removed from the loop and placed in the header node of the SCR. It is also necessary to modify the comparands of the conditional exit C based on v to ensure the trap T cannot cause termination of the program as long as control remains in the loop. A second trap instruction must be placed in the exit from the SCR (not in the loop) to accomplish this.

If the path from C goes directly to the entry node or if there are no other conditional exits on the path from C to the entry node said second trap instruction must be inserted on the path from C that leaves the SCR which causes termination if the induction variable v does not meet the original condition C for loop exit.

If there is another conditional exit on the path from C to the entry node a further conditional branch must be placed on the exit path, said conditional branch leading directly to the exit point if v meets the original loop exit condition C. On the exit path a copy the code inside the loop which can be reached along any path from C to the entry node, must be inserted, but every copied branch or conditional branch which has the entry node as a target must be altered to branch instead to a trap instruction which is guaranteed to cause program termination. Range checks encoded as traps in an SCR could be removed by the following process, if there is a conditional exit from the SCR based on the value of an induction variable v. Suppose that there is a trap in the SCR in which one of the operands is the induction variable v, or a linear function of the induction variable, and that the trap occurs in an articulation node. Then the trap can be eliminated from within the SCR provided certain operations occur:

Step 1: A copy of the trap instruction is placed in the header node.

Step 2: A determination is made that there is only one conditional exit from the SCR based on the value of the induction variable.

Step 3: The conditional exit from the SCR based on the value of the induction variable v is modified to insure that if another iteration of the code in the SCR is taken, the trap will not cause the program to terminate. This involves changing the comparand against which the induction variable is compared to determine if the exit path from the SCR should be taken. If the trap is of the form:

if v>limit then abort  (a)

and the loop closing is of the form:

if v≦m then iterate  (b)

then insert the following computation in the header node:

t=min(limit, m)  (c)

and change the loop closing to the following:

if v≦t then iterate.

Similar transformations may readily be performed for other combinations of relations in the trap and loop closings, as will be evident to those skilled in the art. One trivial variation could be as follows:

if v≧limit then abort  (a)

if v≦m then iterate  (b)

t=min(limit −1,m)  (c)

Step 4: An additional check must be inserted at the loop exit point(s) to insure that the induction variable has reached the value it would have obtained in the original program, that is, before the above-mentioned modification was made. For the situation cited in the previous step, the check would be:

if v≦m then abort.

Figure 3:
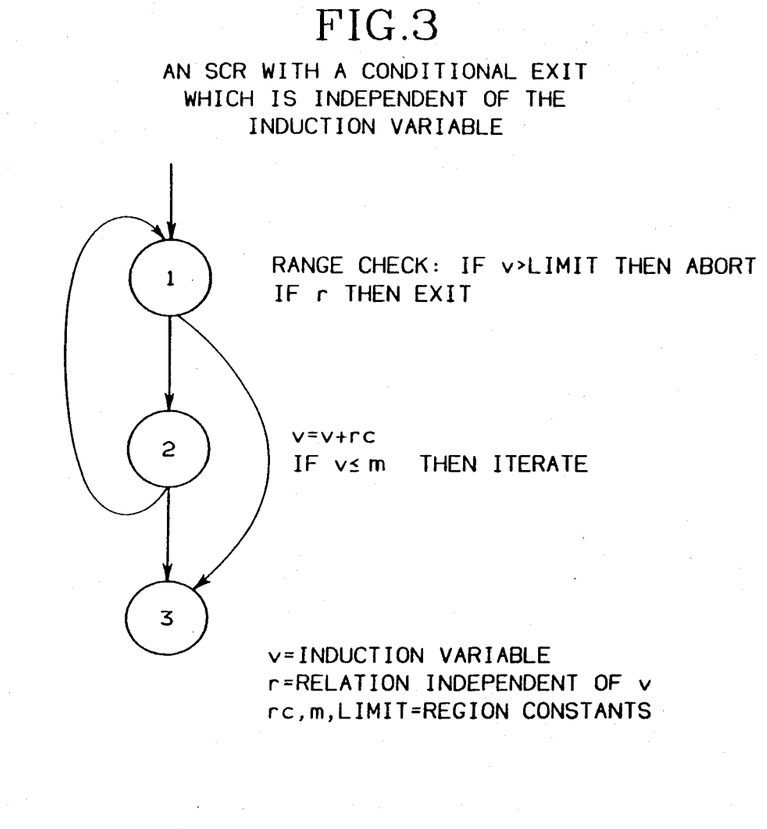
FIG. 3 is a flow graph of an SCR with an additional conditional exit.

To see that the transformed program is equivalent to the original program, if the original program would have failed the range check in the first iteration, then the transformed program fails the range check inserted into the header node, and conversely, if the transformed program fails the range check inserted into the header node, the original program would have failed the range check on the first iteration since the range check in the original program is in an articulation node. The transformed program can only trap thereafter on the range check inserted at the loop exit point. But such a trap indicates that the induction variable did not reach its expected final value. In the original program, additional iterations of the loop would have occurred, one of which would have caused the range check to fail. The Markstein, Cocke and Markstein paper describes how to modify the conditional exit, and how to insert the new check at program exit. Thus at the cost of performing one trap prior to entering a loop, and one trap after exiting from that loop, the trap within the loop (which is a region of high execution frequency) can be removed. The paper, on pp 116–117, observes that if there are exits from the SCR which are independent of the induction variable, then these exits have no effect on the analysis. For flow graphs such as the ones shown in FIG. 3, the observation is correct. These flow graphs are characterized by additional loop exists, but whether or not to take these exits does not involve the induction variable. Furthermore, these exit decisions occur during a loop traversal before the exit decision based on the induction variable is encountered.

Figure 5:
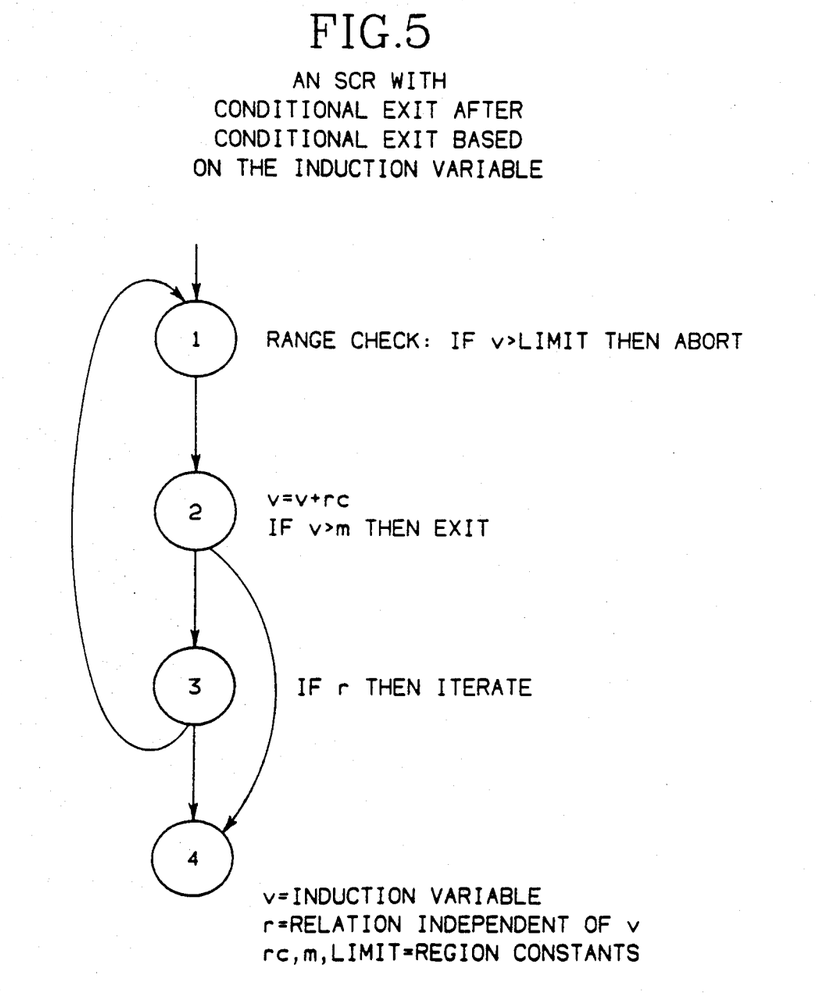
FIG. 5 is a flow graph of an SCR with a conditional exit that follows a conditional exit based on the induction variable, which can erroneously be transformed from a correct program to an incorrect program.

However, loop exits not based on the induction variable that occur on control flow paths between the loop exit based on the induction variable and the SCR entry node were not considered. FIG. 5 characterizes this situation. Suppose that the trap occurs in block 1 and that the induction variable is tested in block 2. If the induction variable has attained a certain value, control leaves the SCR and flows to block 4. The paper's algorithm directs altering the test in block 2 to guarantee that the range check in block 1 cannot cause termination. This is still correct.

However, the last of the steps outlined above requires that on the path from block 2 to block 4, a test be inserted that the induction variable attained the value it would have attained had the test in block 2 not been changed. This is correct only if the test on the induction variable were not followed by other tests which lead to loop exit.

Figure 6:
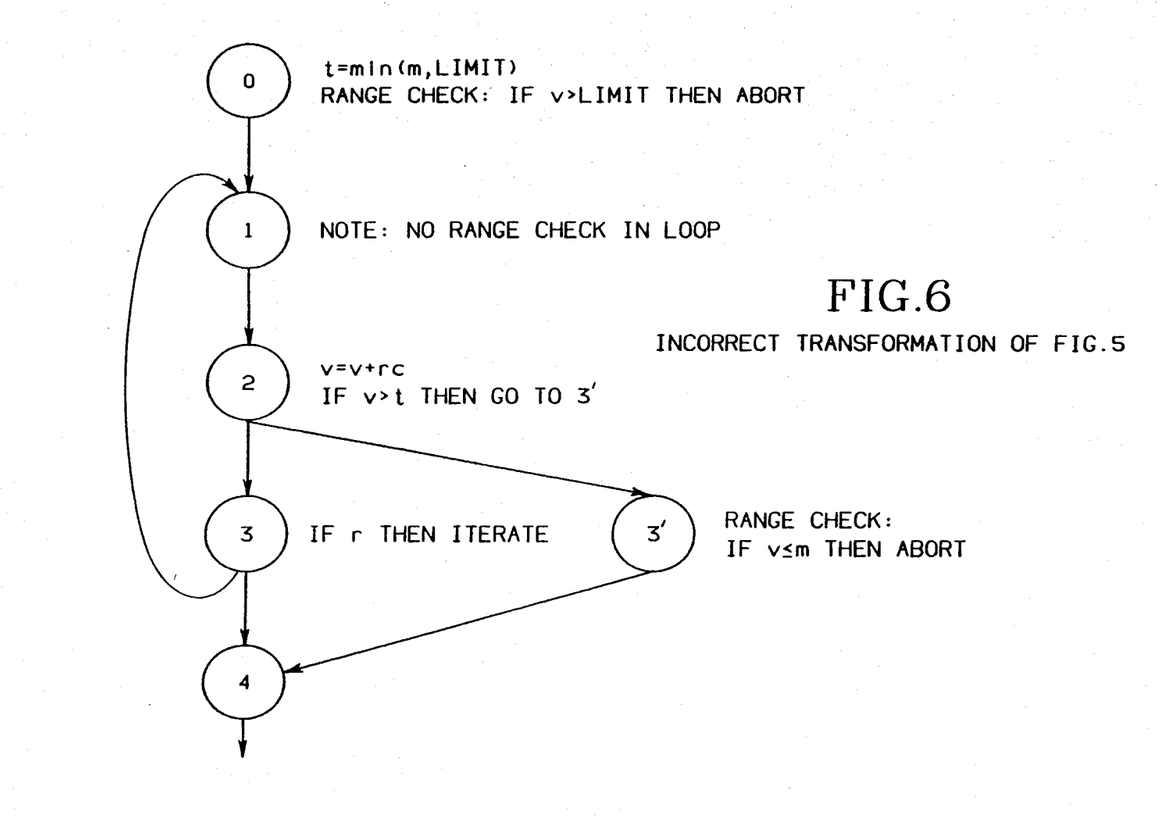
FIG. 6 is the flow graph into which the flow graph for FIG. 5 would be erroneously transformed by the cited paper.

In a SCR such as depicted in FIG. 5, the test in block 3 may have caused an exit from the loop even before the induction variable attained its intended value. Thus, a situation can arise in which the induction variable has attained a value large enough to cause the range check to fail on the next iteration, but not large enough to reach its intended final value. The inserted test on the path from block 2 to block 4 in FIG. 6 would then indicate that in the unmodified program, a trap would have occurred in the loop. However, in the unmodified program, it could have been the case that even though the induction variable has become out of range for the next iteration of the loop, the additional loop exit condition in block 3 prevents the next iteration from occurring. Therefore, it may be the case that the inserted test on the path from block 2 to block 4 incorrectly indicates that a trap would have occurred in the original program.

Figure 1:
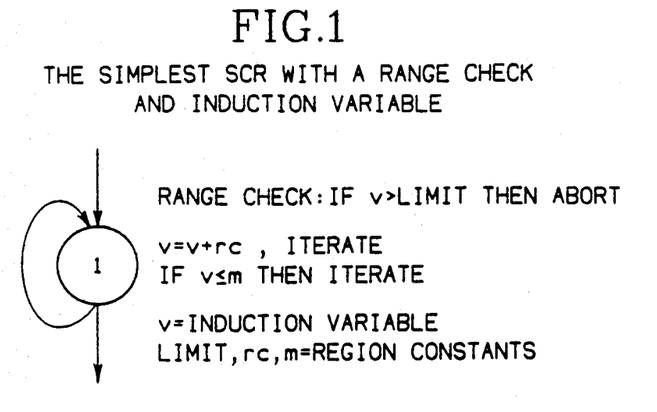
FIG. 1 is a flow graph for a very simple program loop (SCR).
Figure 2:
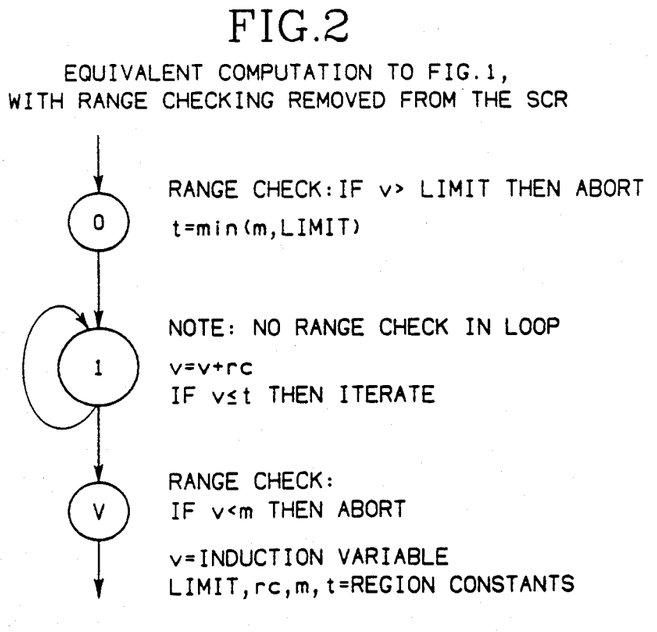
FIG. 2 is the flow graph of a program sequence which is equivalent to FIG. 1 with the range checking step removed from the loop.

FIG. 1 illustrates the simplest SCR. The Markstein, Cocke and Markstein paper correctly describes how to process such a flow graph, and FIG. 2 shows the result of range check optimization following the procedures described in the paper.

The present invention correctly performs trap optimization, following the overall scheme given in the Markstein, Cocke and Markstein paper referenced above except for a modification to Step 4, described above in the Prior Art section. According to the present invention, the original Step 4 (repeated below for convenience of reference) disclosed in the referenced article is modified as follows:

Old Step 4: An additional check must be inserted at the loop exit point(s) to insure that the induction variable has reached the value it would have obtained in the original program, that is, before the above-mentioned modification was made. For the situation cited in the previous step (step 3 of the example described previously) the check would be:

if $v < = m$ then abort.

New Step 4: On the path from the conditional exit based on the induction variable, to the node outside the SCR, a test must be placed to insure that the induction variable has reached the value it would have obtained in the original program, provided that there are no other tests between the conditional exit and the entry block of the SCR.

If the induction variable has not attained its expected final value, it is because the modified conditional exit instruction prevented iteration, since on the next iteration, the trap instruction would have caused program termination because of range check violation.

If there are other conditional exits between the conditional exit and the entry block of the SCR, two items must be added along the exit path from the conditional exit based on the induction variable, and the exit node. First a test is inserted to ascertain whether the induction variable had attained its expected value. (Node 3' in FIG. 7.)

Figure 7:
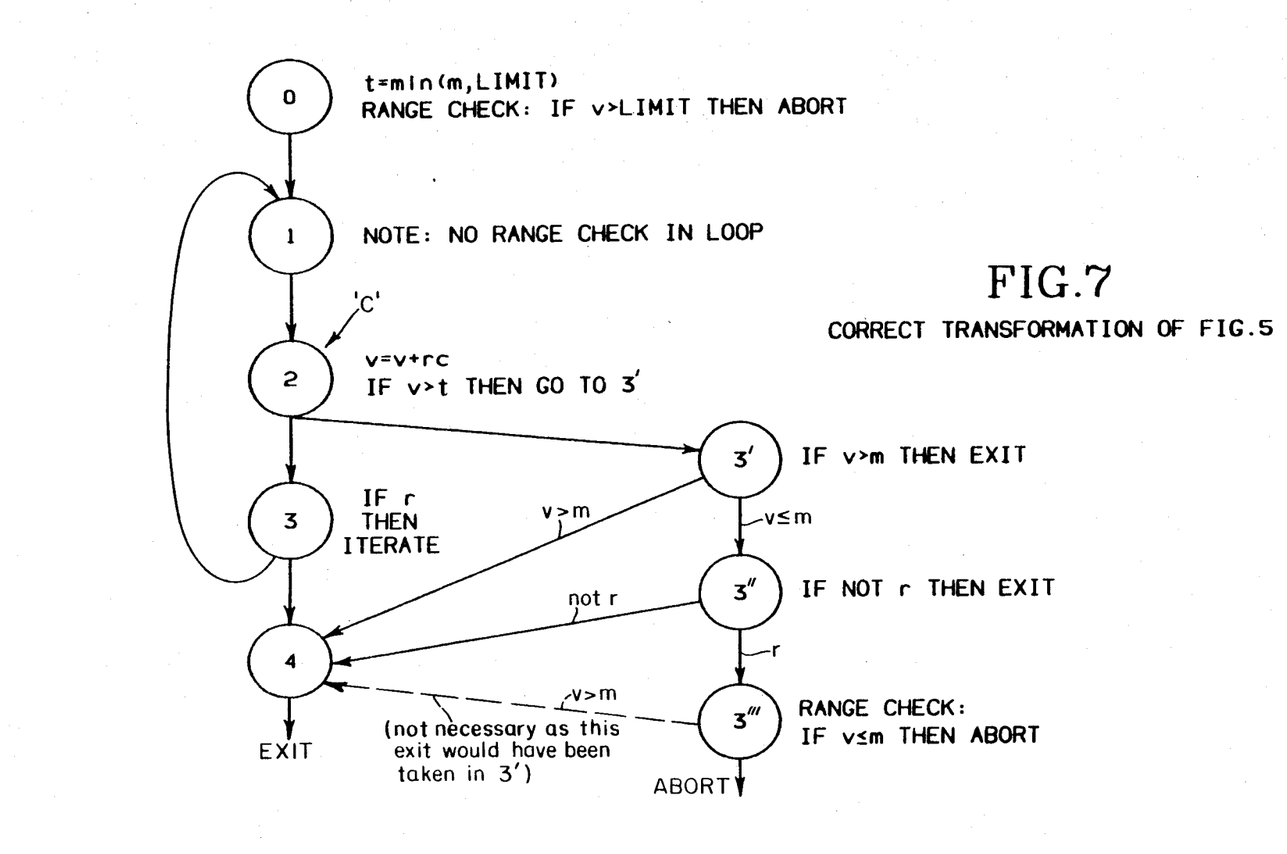
FIG. 7 is the flow graph into which the flow graph for FIG. 5 would be transformed by the present invention.

That is, if v attained the expected value, the original program would have branched to the exit node, and so should the modified program. Second, the subgraph between the conditional exit based on the induction variable and the entry node must be copied along the exit path. This is needed because a loop exit might occur in the original program from one of the other conditional exits before the induction variable has attained its final value. (Node 3" in FIG. 7.) However, where in the original graph, an edge would lead to the entry node, in the copied graph, the edge must lead to program termination; that is to say, an attempt in the copied code to return to the loop must indicate a range check in the next iteration of the loop. (Node 3''' in FIG. 7.) FIG. 7 illustrates how the flow graph in FIG. 5 must be modified when range check optimization is performed.

The preceding description of the invention referring to FIGS. 1 through 7 is believed to fully and completely describe the present invention in sufficient detail to allow skilled programmers to incorporate the concepts disclosed herein in an appropriate optimizing compiler. FIGS. 1 through 7 are examples to which the present invention applies. These figures also show how the examples are transformed by the invention.

FIGS. 8 through 11 are more conventional flow charts which will specify the detailed operations necessary in practicing the invention to a greater level of particularity.

Figure 8:
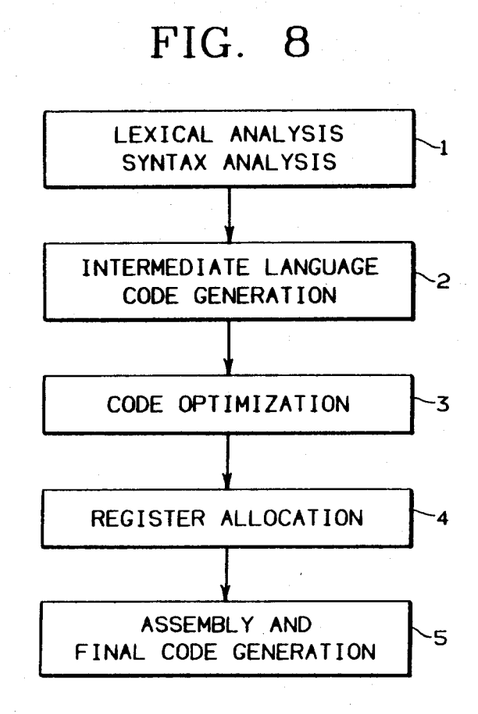
FIG. 8 comprises a high level flow chart of a compiler which contains a code optimization phase in which the present invention finds use.

In these figures, FIG. 8 is a high level flow chart of a conventional optimizing compiler as is well known in the art. Blocks 1, 2, 4 and 5 are quite straight forward and well known. Block 3 entitled, "Code Optimization," is the phase of the compiler activity to which the present invention applies and is represented in more detail in FIG. 9.

Figure 9:
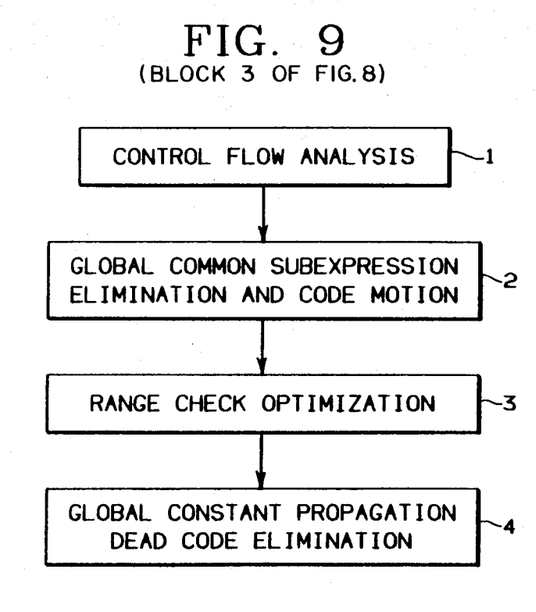
FIG. 9 comprises a high level flow chart of the code optimization phase of a compiler in which the present invention finds use.

FIG. 9 is a flow chart of the code optimization phase for such an optimizing compiler. The operations performed in blocks 1 and 4 are straight forward and well known in the art. Block 2 entitled, "Global Common Subexpression Elimination and Code Motion," relates to an optimization phase generally known in the art. However, for a specific reference to a particular method of achieving this form of optimization, reference is made to copending application Ser. No. 640,283 entitled, "Method for Improving Global Common Subexpression Elimination and Code Motion in an Optimizing Compiler," of Auslander et al filed Aug. 13, 1984.

Block 3 entitled, "Range Check Optimization," is the specific area of the optimizing compiler to which the present invention applies. This block is shown in expanded form in FIGS. 10 and 11. The location of block 3 shows where range optimization should be performed relative to other optimizations. In the event that the actual values of region constants are known, it is possible to determine the results of some of the instructions which are inserted in the header node and the exit nodes. This can lead to greatly simplified final code. It is the job of global constant propagation and dead code elimination (block 4) to perform these simplifications. There is no attempt herein to incorporate constant propagation or dead code elimination into the present invention as indicated above as it would only tend to obfuscate the invention.

Figures 9, 10:
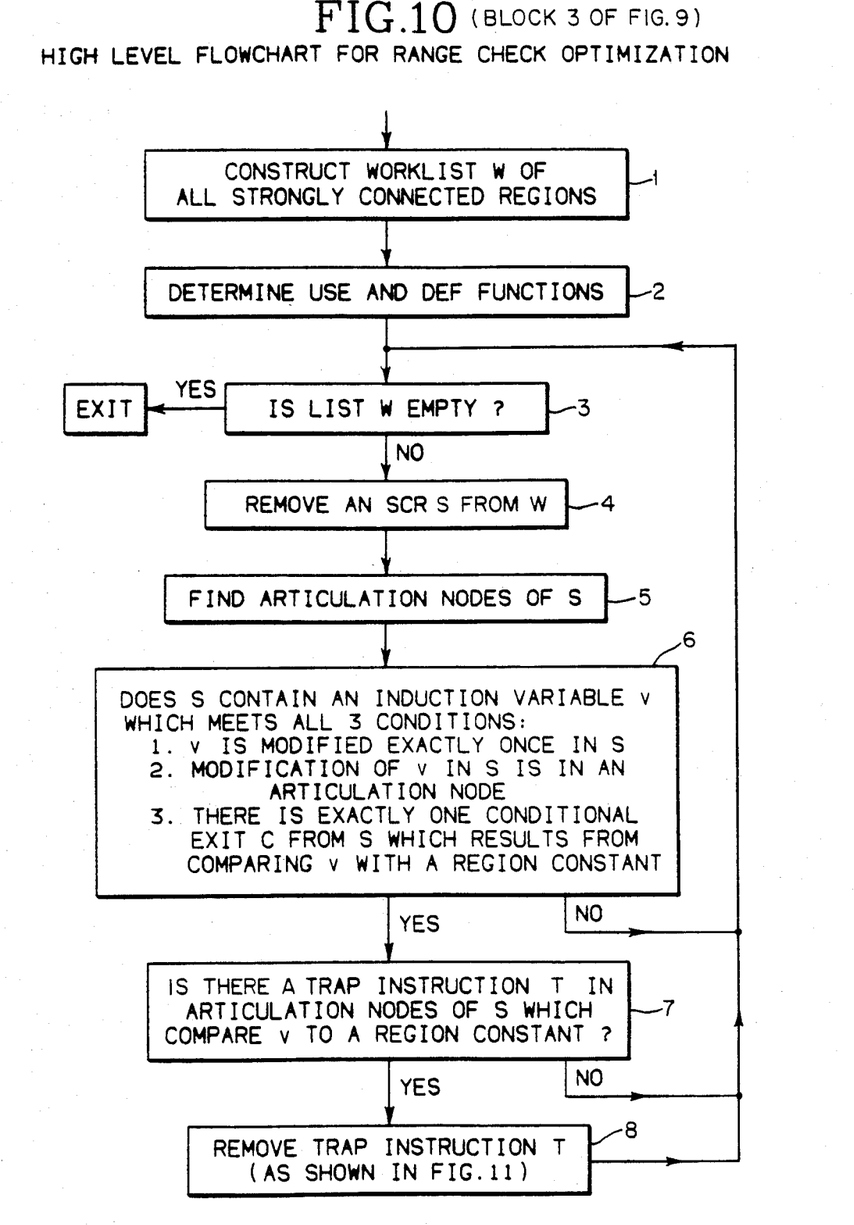
FIG. 10 comprises a high level flow chart of range checking optimization.

FIG. 10 comprises a high level flow chart for the range check optimization feature of the present invention.

Blocks 1 and 2 of the figure involve identifying and listing the SCRs and determining the USE and DEF functions. As will be well understood, these functions may be readily accomplished by examining, for example, a list of intermediate language instructions and looking at the nature of each instruction to determine where SCRs begin and end. The USE and DEF functions would be determined by examining the operands specified for the various instructions. As will be appreciated, these two functions could be accomplished early in the overall compiler flow or separately as indicated in block 3 of FIG. 9.

Block 3 is merely a test to determine if all of the SCRs identified for particular program being compiled have been processed for possibilities of range check optimization. As long as there is still an SCR candidate, the system would proceed to block 4 where the specific SCR would be removed from the list for processing. The first step of the processing is performed in block 5 where all articulation nodes of the SCR(S) are identified and marked. The system then proceeds to block 6 where a determination is made to ascertain whether or not S contains an induction variable (v) which meets three specified conditions which are necessary before the present invention can be applied. These three conditions are specified in block 6 of the drawing but are repeated here for convenience of reference. They are as follows:

1. v is modified exactly once in S,
2. The modification of v in S is in an articulation node,
3. There is one conditional exit C from S which results from comparing v with a region constant.

If no such induction variable is found in S the system returns to block 3 and the next SCR is accessed.

If the test in block 6 is positive, the system proceeds to block 7. This block determines whether or not there is a trap instruction T in one of the articulation nodes of S which compares v to a region constant. If not, again the system returns to block 3 since the present invention does not apply. If the test is positive, the system proceeds to block 8 which is shown in greater detail in FIG. 11. It should be clearly understood that the overall function of this block is to remove the trap instruction from the SCR, place the trap instruction in the header node thereof, and also to insert additional instructions where necessary in the exit from the SCR (not in the loop) to make sure that all specified conditions in the original program are adequately tested for.

Figure 11:
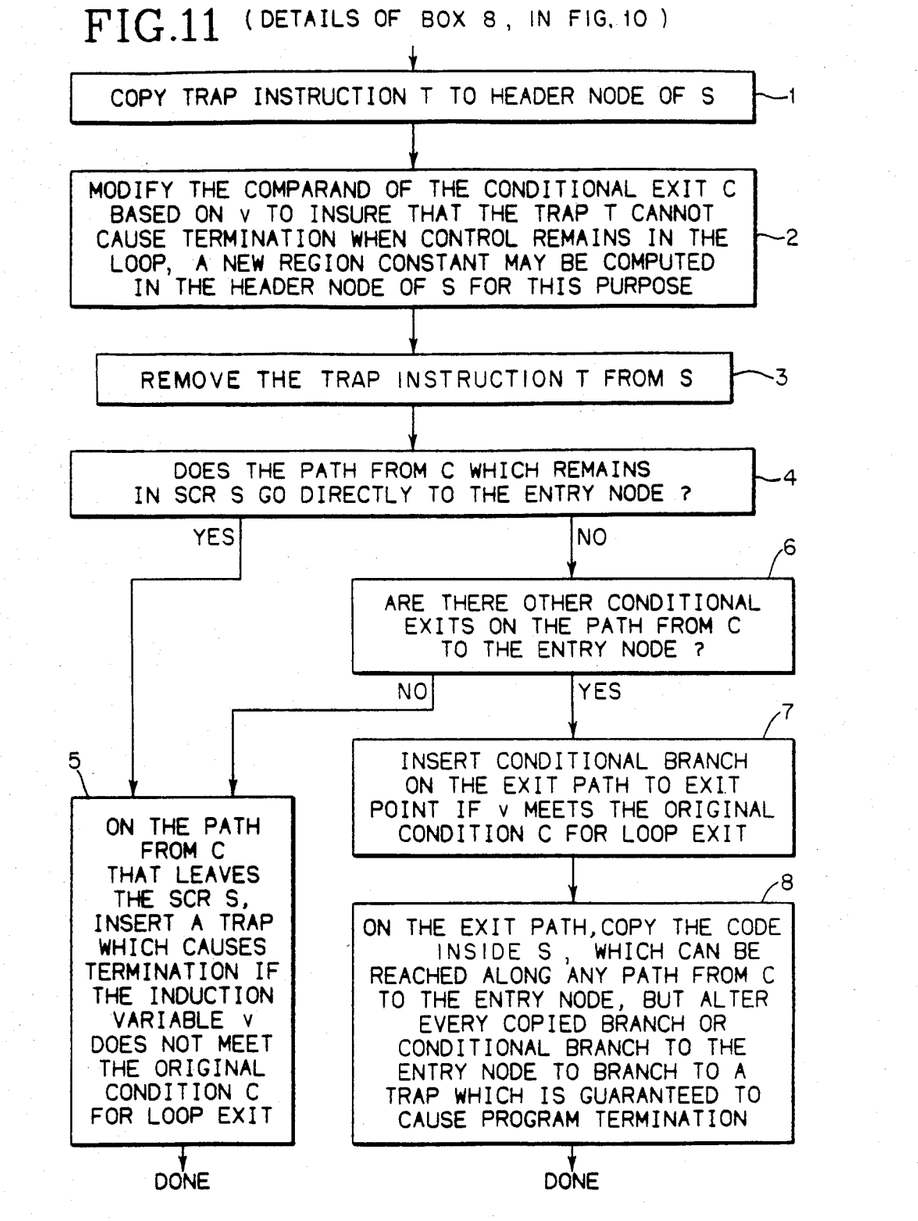
FIG. 11 comprises a high level flow chart of the processing required to eliminate range checks from a single-entry strongly connected region.

Referring to FIG. 11, this procedure becomes active when it is determined that a specific SCR has been found having a range check and induction variable meeting the requirements specified in FIG. 10 which lead the control flow to block 8 of FIG. 10 and thus block 1 of FIG. 11. In the sequence of FIG. 11, the specific details of modifying the originally programmed SCR(S) are set forth, as will be understood.

Figure 4:
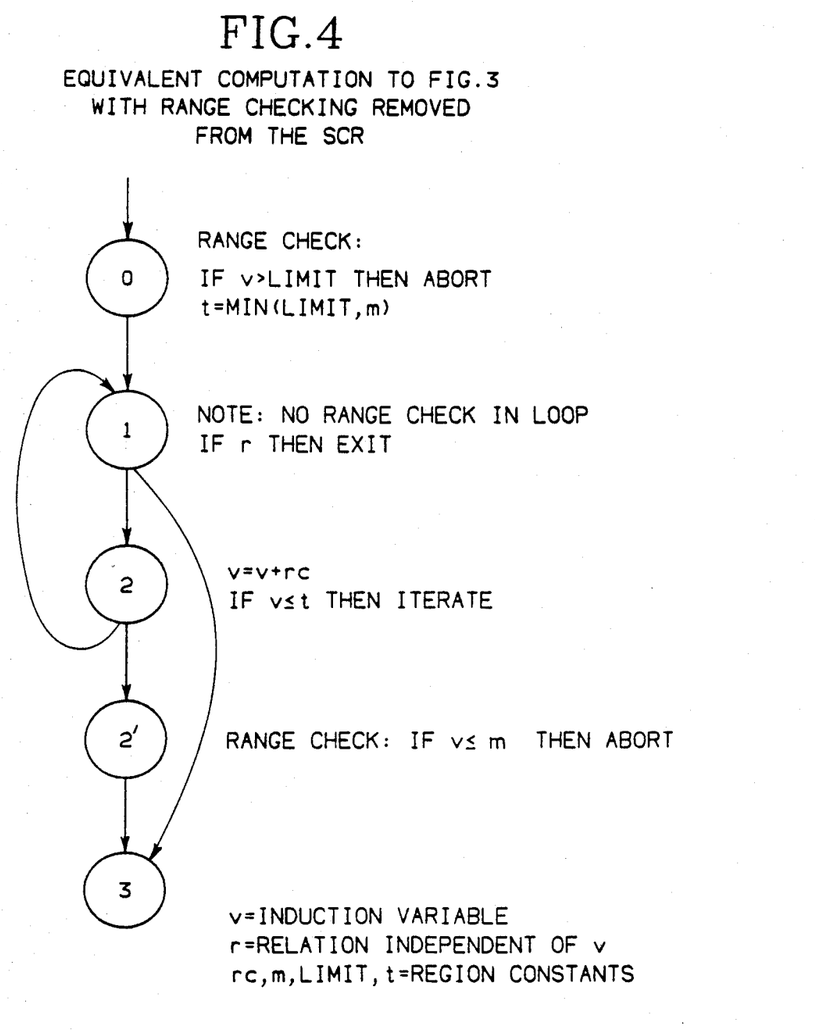
FIG. 4 illustrates the flow graph which results from applying range check optimization to the SCR of FIG. 3.

The first operation that occurs is to copy the trap instruction T into the header node of S. Thus in FIGS. 2, 4 and 7 which represent properly revised programs that instruction is shown as Range Check: if $v > LIMIT$ then ABORT. Proceeding to block 2, this step ensures that the comparands of the conditional exit C based on the induction variable v are modified to ensure that the trap instruction T cannot cause termination of the program when control remains in the loop. As the loop is executed repeatedly, the induction variable increases, so that on a later execution of the loop, T might cause program termination. Block 2 modifies the loop so that T cannot cause termination and thus justifies the action of block 3. In the examples illustrated in FIGS. 1, 3 and 5 this is accomplished by creating a new region constant t which is computed in the header node as shown in FIGS. 2, 4 and 7 this new region constant is shown as: $t = \min(m, LIMIT)$.

Next in block 3 the trap instruction T is removed from S. The system then proceeds to block 4 in which a determination is made as to whether the program flow goes from the conditional exit C which remains in S directly to the entry node. The particular exit C to which this block applies is the one containing the induction variable v specified in the block 2. In the case of the examples of FIGS. 1 and 3 the path from C does go directly to the entry node. In this event the system branches to block 5. It will be noted that in the case of the example of FIG. 5, the program flow does not go from the conditional exit "2" back to the entry node "1" but instead proceeds to node "3".

The SCR present in the case of the example of FIG. 5 would cause the system to proceed to block 6.

Considering first the possibility of the system proceeding to block 5, this block would cause a trap instruction to be inserted on the path from C that leaves S which will cause termination of the program if the induction variable v does not meet the original condition C for loop exit. In the case of the compiled programs shown in the examples of FIGS. 2 and 4, this new range check is "IF $v > m$ THEN ABORT". As stated previously this second range check, again out of the loop, assures against some programming error which would have caused the original to repeat the loop once more and on that next iteration, to have terminated as a result of the trap removed in block 3 of FIG. 10.

Returning to block 6 of FIG. 11 a test is made to see if there are other additional exits on the path from C to the entry node. If there were other node operations in the return loop from the conditional exit to the entry node which were not conditional exits, the system would proceed back to block 5 as described above. However, in the case of the example of FIG. 5 which situation the present invention specifically applies the system would proceed to block 7.

In this block a conditional branch is inserted on the exit path to the exit point if the induction variable v meets the original condition C for loop exit. This is represented by node "3'" in FIG. 7.

Program flow then proceeds to block 8. Code which can be reached from condition C to the entry node is inserted on the exit path. But where the original code provides paths to S's entry node, in the copied code, these paths must lead to program termination. The reason for this change to the copied code is that by having gotten onto the exit path by the modified conditional exit instruction C, it is known that a return to the header exit will lead to program termination on the next iteration. But since the trap T has been removed from within the loop S, an alternate mechanism must be provided outside S for the purpose of terminating the program.

While block 8 causes additional code to be inserted into the program, it should be remembered that this additional code is outside the strongly connected region S, and is only executed once each time the loop S is performed. On the other hand, the code in S is traversed several times so that removing the trap T from the interior of S will give a net performance improvement.

Looking at FIGS. 5 and 7 in FIG. 7, node 3" is a copy of node 3 of FIG. 5, but wherever an edge from 3 goes to the header node 1 in FIG. 5, the corresponding edge in FIG. 7 goes to a range check (node 3'") which is guaranteed to cause program termination.

Having thus described our invention, what we claim as new, and desire to secure by Letters Patent is:

1. A method for use within the code optimization phase of an optimizing compiler operable to move certain range check instructions out of single entry strongly connected regions (SCR) or loops and into linear regions of the instruction stream whereby computational efficiency is increased with no loss of program accuracy, said method comprising placing a range check trap instruction into the header node of the SCR provided there is only one conditional exit from the SCR based on the induction variable, and additional conditional exits none of which are based on the induction variable, modifying the conditional exit test based on the value of the induction variable (v), and inserting additional checks at the loop exit point(s) to insure that the induction variable has reached the value it would have obtained in the original (unmodified) program.

2. A method as set forth in claim 1 wherein the modifying of the conditional exit test to form a single test parameter comprises logically combining the range check with other limits placed on the induction variable which could cause a conditional exit.

3. A method as set forth in claim 2 wherein inserting said additional checks further comprises, inserting all code which can be reached going from the condition C to the entry node, in the exit path in such a fashion that a detected condition which would return control to the entry node will now cause program termination.

4. A method for use within an optimizing compiler for removing range checking trap instructions from program single entry strongly connected regions (SCR) or loops and placing said instructions in linear portions of the instruction stream whereby the frequency of execution of said instruction will be greatly reduced thus resulting in significant improvements in the efficiency of the execution of the resultant compiled program, said method comprising a procedure for recoding such programs wherein the SCR is characterized by a conditional exit based on an induction variable (v) followed by a conditional exit not based on the induction variable (v), the procedure including identifying a single entry strongly connected region (SCR) within an instruction stream having a trap instruction therein for the purpose of range checking, said trap instruction being in an articulation node which compares v to a region constant, determining if the loop meets three conditions for the induction variable (v): (1) v is modified exactly once in the loop, (2) modification of v in the loop is in an articulation node, and (3) there is exactly one conditional exit C from the loop which results from comparing v with a region constant, removing the trap instruction from the loop and placing it in the header node of the SCR, modifying the comparands of the conditional exit C based on v to ensure the trap T cannot cause termination of the program as long as control remains in the SCR and placing a second trap instruction in the exit from the SCR.

5. A method as set forth in claim 4 including determining if the path from C goes directly to the entry node, and if so, inserting said second trap instruction on the path from C that leaves the SCR to cause termination of the program if the induction variable v does not meet the original condition C for loop exit.

6. A method as set forth in claim 5 including determining if there is another conditional exit on the path from C to the entry node and if so inserting a further conditional branch on the exit path to the exit point if v meets the original condition C for loop exit, and inserting on the exit path the code inside the loop which can be reached along any path from C to the entry node, and altering every branch or conditional branch which is copied into the exit path which could cause a return to the entry node to branch to a trap which is guaranteed to cause program termination.

* * * * *